US007929559B2

(12) United States Patent
Hao

(10) Patent No.: US 7,929,559 B2
(45) Date of Patent: Apr. 19, 2011

(54) METHOD OF SCHEDULING MESSAGE DELIVERY IN A WIRELESS COMMUNICATION SYSTEM

(75) Inventor: Qing Feng Hao, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 816 days.

(21) Appl. No.: 11/878,824

(22) Filed: Jul. 27, 2007

(65) Prior Publication Data

US 2008/0160962 A1 Jul. 3, 2008

(30) Foreign Application Priority Data

Dec. 29, 2006 (CN) .......................... 2006 1 0064440

(51) Int. Cl.
*H04M 1/725* (2006.01)
*H04L 12/58* (2006.01)
(52) U.S. Cl. .............. 370/412; 379/211.01; 379/207.02; 379/221.08; 379/88.22; 379/223; 379/246; 379/206; 455/415; 455/461; 455/446
(58) Field of Classification Search ............ 379/211.01, 379/207.02, 221.08, 88.15, 88.22, 88.17, 379/223, 246, 206; 455/415, 461, 446
See application file for complete search history.

(56) References Cited

U.S. PATENT DOCUMENTS

| 6,263,051 | B1 | 7/2001 | Saylor et al. | |
| 6,950,502 | B1 * | 9/2005 | Jenkins | 379/88.12 |
| 2003/0148758 | A1 * | 8/2003 | McMullin | 455/415 |
| 2004/0005046 | A1 * | 1/2004 | Deo et al. | 379/220.01 |
| 2004/0034690 | A1 * | 2/2004 | Schmitz | 709/206 |
| 2004/0234050 | A1 * | 11/2004 | Muller | 379/88.17 |
| 2005/0021713 | A1 * | 1/2005 | Dugan et al. | 709/223 |
| 2005/0041792 | A1 * | 2/2005 | Bedingfield, Sr. | 379/211.01 |
| 2005/0041794 | A1 * | 2/2005 | Cox et al. | 379/218.02 |
| 2008/0096588 | A1 * | 4/2008 | Waytena et al. | 455/466 |

FOREIGN PATENT DOCUMENTS

| EP | 1 670 227 | 6/2006 |
| GB | 2 361 835 | 10/2001 |
| WO | WO 03/077515 | 9/2003 |

OTHER PUBLICATIONS

International Search Report and Written Opinion dated May 19, 2008.

* cited by examiner

*Primary Examiner* — Marivelisse Santiago-Cordero
*Assistant Examiner* — Joseph Arevalo
(74) *Attorney, Agent, or Firm* — Harness, Dickey & Pierce

(57) ABSTRACT

In one embodiment, a network element of the wireless communication system receives a request from a scheduling party. The request is for scheduling message delivery to a destination party. Message delivery parameters are obtained in response to the request. The message delivery parameters may include a date of delivery and contact information for the destination party. The message to be delivered is also obtained. The obtained message is then sent to the destination party as set forth by the obtained message delivery parameters.

7 Claims, 3 Drawing Sheets

METHOD OF SCHEDULING MESSAGE DELIVERY IN A WIRELESS COMMUNICATION SYSTEM

BACKGROUND

Example embodiments may relate to communication, for example, mobile phone communication and/or communication networks.

People and groups of people (e.g., co-workers, friends, family, etc.) often times have particular dates or times of special meaning and/or importance. For example, there are many holidays throughput a typical year and almost everyone enjoys celebrating a birthday. However, more often than not, a person's career or personal situation may render them unable to readily communicate with their friends and family, or may leave them tired and unmotivated at the end of a work day, and the person may be unable to communicate their best wishes for the special date.

In some conventional mobile phones, a user may be able to set up an alarm or timer to help remind them to telephone a friend or family member on a particular date, such as a holiday. However, if the user of the mobile phone is not near the device, or if the device is inoperable or set to silent alert, the user may not hear the alarm. Furthermore, even if the user were to hear the alarm, the device may not be within range to make the phone call, or the user may be unable to dial, thereby preventing the call from taking place.

SUMMARY

The present invention relates to a method of providing scheduled message delivery in a wireless communication system.

In one embodiment, a network element of the wireless communication system receives a request from a scheduling party. The request is for scheduling message delivery to a destination party. Message delivery parameters are obtained in response to the request. The message delivery parameters may include a date of delivery and contact information for the destination party. The message to be delivered is also obtained. The obtained message is then sent to the destination party as set forth by the obtained message delivery parameters.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting, wherein.

DETAILED DESCRIPTION OF EXAMPLE EMBODIMENTS

Although example embodiments will be described herein with reference to a generic wireless communication system and mobile phone, it will be recognizable to one of ordinary skill that example embodiments may apply to virtually any communication system. For example, example embodiments may apply to IP multimedia subsystems (IMS) and any other communication system where a user desires to schedule communication. These systems may employ a variety of communication protocols such as CDMA, CDMA2000 1x, CDMA2000 1xEV-DO, and CDMA2000 1xEV-DV, although example embodiments should not be limited to only these examples.

As discussed above, methods and/or apparatuses are needed which are able to schedule communication independent of a mobile device's memory, functional state, and service state. Current wireless communication systems provide users with the ability to communicate to and from other mobile station users and users on most landline services. There are generally two types of wireless communication systems, circuit-switched (CS) and packet-switched (PS) systems.

In a typical circuit-switched wireless communication system, a Mobile Switching Center (MSC) connects a landline Public Switched Telephone Network (PSTN) to a wireless communication system. The MSC is typically split into an MSC server and a Media Gateway (MGW), and may incorporate the Bearer Independent Call Control (BICC) protocol or the ISDN User Part (ISUP) call control protocol for call delivery between the MSCs of the wireless communication system.

Figure 1:
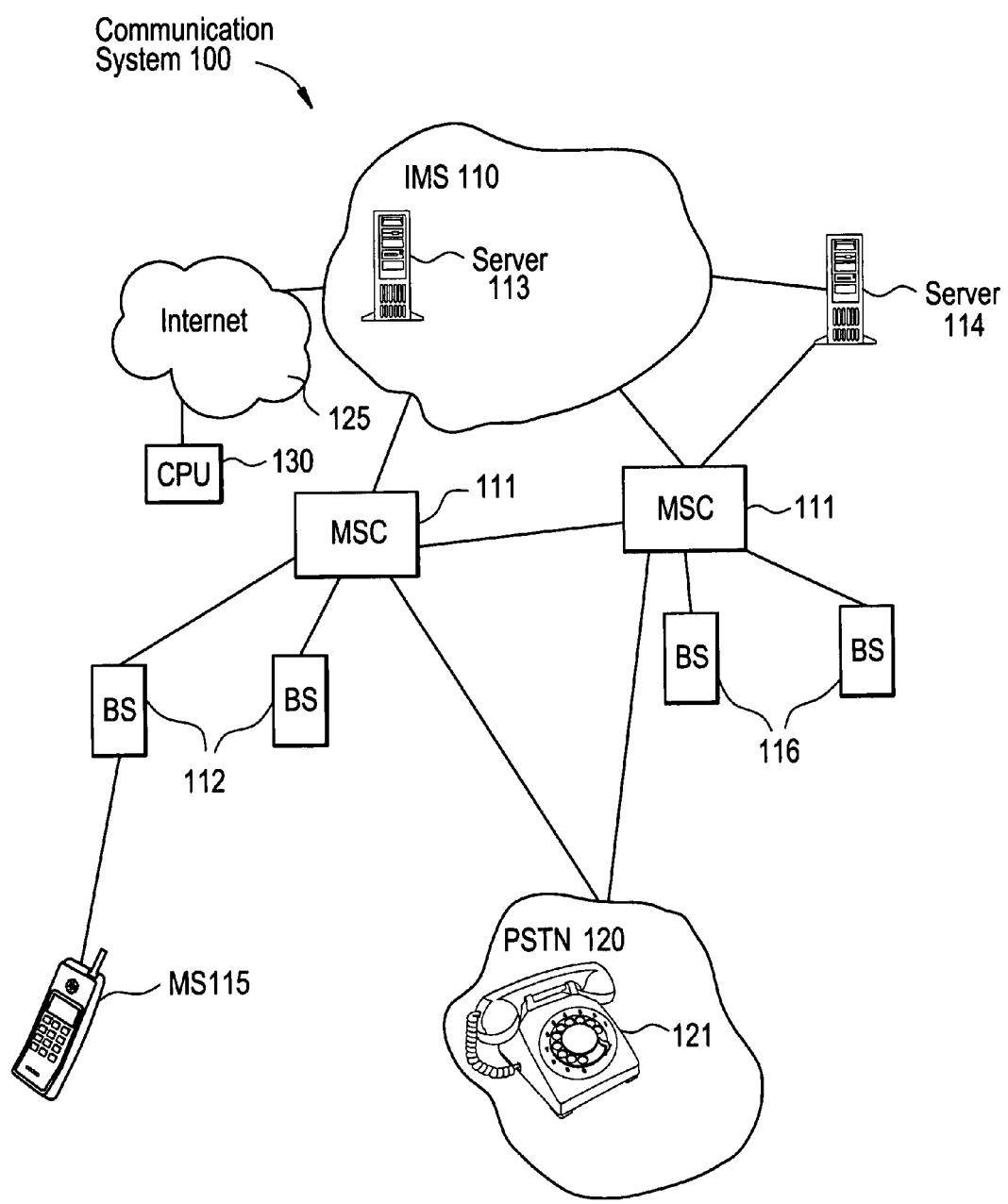
FIG. 1 is a diagram illustrating a communication system, according to an example embodiment.

FIG. 1 is a diagram illustrating a communication system, according to an example embodiment. As shown, a mobile station MS 115 may communicate with a base station BS 112 over an air interface. Examples of a mobile station include a mobile unit, a wireless phone, a mobile phone, a wireless equipped PDA or computer, etc. Multiple base stations 112 may communicate with a mobile switching center (MSC) 111, which may provide signaling and/or traffic processing for wireless sessions. FIG. 1 depicts multiple mobile switching centers 111, each able to communicate with multiple base stations 112. It will be understood that more or less base stations and/or mobile switching centers could be used to practice example embodiments. Each mobile switching center 111 also provide connectivity to a public switched telephone network PTSN 120. A typical landline phone 121 may be connected to the PTSN 120.

FIG. 1 also illustrates an IP multimedia subsystem (IMS) 110. IMS 110 may include, for example, a server 113. IMS 110 may be in communication with one or more mobile switching centers 111, thereby facilitating communication between the server 113 and mobile stations in range of a base station and/or landline phone 120. Furthermore, in an alternative embodiment, the IMS 110 may additionally replace the functionality of the MSCs. The IMS 110 may also be in communication with a second server 114. The server 114 may be in communication with one or more of the MSCs 111. As such, it will be understood that sever 114 may communicate with any or all of server 113, landline phone 120, or any mobile station or entity in the communication system 100. Still further, the IMS 110 may provide communication with parties over the internet 125. For example, FIG. 1 shows a computer 130 connected to the internet 125, which may communicate with the IMS 110. More specifically, the IMS 110 may provide interfaces by which mobile users 115 may surf the internet 125, or communicate with parties such as the computer 130 via the internet 125. Additionally, a user may communicate with the server 113 using a computer 130 via the internet to establish services as discussed in detail below.

The server 113 and the server 114 may be voice recorder servers according to example embodiments, and may be embodied as mass storage devices able to store voice-recorded messages. For example, MS 115 may be able to initiate a call to server 113 (or server 114) and record a voice message on the server 113 (or server 114). Alternatively, the server 113 and the server 114 may include a database and a mass storage device, or a database included in a mass storage device, although example embodiments should not be limited to just these examples.

Furthermore, as discussed above, the server 113 and the server 114 may be able to communicate back to a calling party. The server 113 and the server 114 may prompt calling parties to enter information and may store the information along with a voice-recorded message and/or text message. An example scenario will be described to aid in understanding the actions of which the servers 113 and 114 are capable.

The following example scenario is given for the purpose of explaining an example embodiment and should not be construed as limiting. A user Mike is the owner of MS 115. Mike wishes to call his sister on a holiday three (3) days from now, but realizes that his schedule is too busy, and he may forget to make the phone call. Mike may use MS 115 to call into server 113.

While on the call to server 113, the server 113 may prompt Mike for a plurality of information correlating to the details of the call he wishes to schedule. For example, the details of the call he wishes to schedule may include, but are not limited too, time of the call, date of the call, name of the called party, phone or mobile number of the called party, and/or any other pertinent information the server needs to contact the called party. The details of the call may also be simple, and may only include the called party number and the time the call is to be made.

It will be understood that called party in this example pertains to Mike's sister, who has not actually been called at the time Mike is on the call to the server 113. Mike's sister, in this example, is the owner of landline telephone 121, and is able to place calls to users in the communication system 100.

After Mike enters the information correlating to details of the call he wishes to schedule, the server 113 may prompt Mike for entering a special message to the called party, in this example, best holiday wishes for his sister. Mike, when prompted, would speak into MS 115 such that his voice may be recorded by server 113. The server 113 may record and store Mike's holiday message, and either end the call, prompt Mike to start over, or record a subsequent message, either for his sister, or another telephone number.

Three (3) days later, on the holiday, Mike is busy at work, and Mike's sister is enjoying the holiday. At the time Mike specified to the server 113, or at least at the default time stored on the server 113, Mike's sister will receive a phone call from the server 113. When Mike's sister answers, Mike's pre-recorded best holiday wishes will be played back for Mike's sister to hear. Afterwards, Mike's sister may return the call to speak with Mike in person, or may be comforted in knowing Mike remembered the special holiday.

In an example embodiment, although the server 113 makes the phone call for Mike, the calling party number displayed on Mike's sister's phone may be Mike's number (or at least the number pertaining to MS 115). This is advantageous in that it gives Mike's sister the impression that her brother is personally calling, and enables Mike's sister to be able to call Mike back directly, without searching for Mike's phone number.

Although the scenario was described with reference to Mike calling the server 113, example embodiments should not be limited to servers within a wireless network. For example, example embodiments may be applied to servers completely or partially independent from wireless networks, such as the server 114.

Furthermore, although this scenario was described with reference to Mike scheduling a call to his sister, the contrary is also possible. For example, Mike's sister, using landline phone 121, could have scheduled a call with server 114 to call her brother during her brother's special holiday, whenever that might be.

After the call has ended, the server 113 may then recycle the storage space used by Mike for another scheduled call, save the space for future use by Mike, or may simply delete it.

Hereinafter, the details of a scheduled communication will be described.

Figure 2:
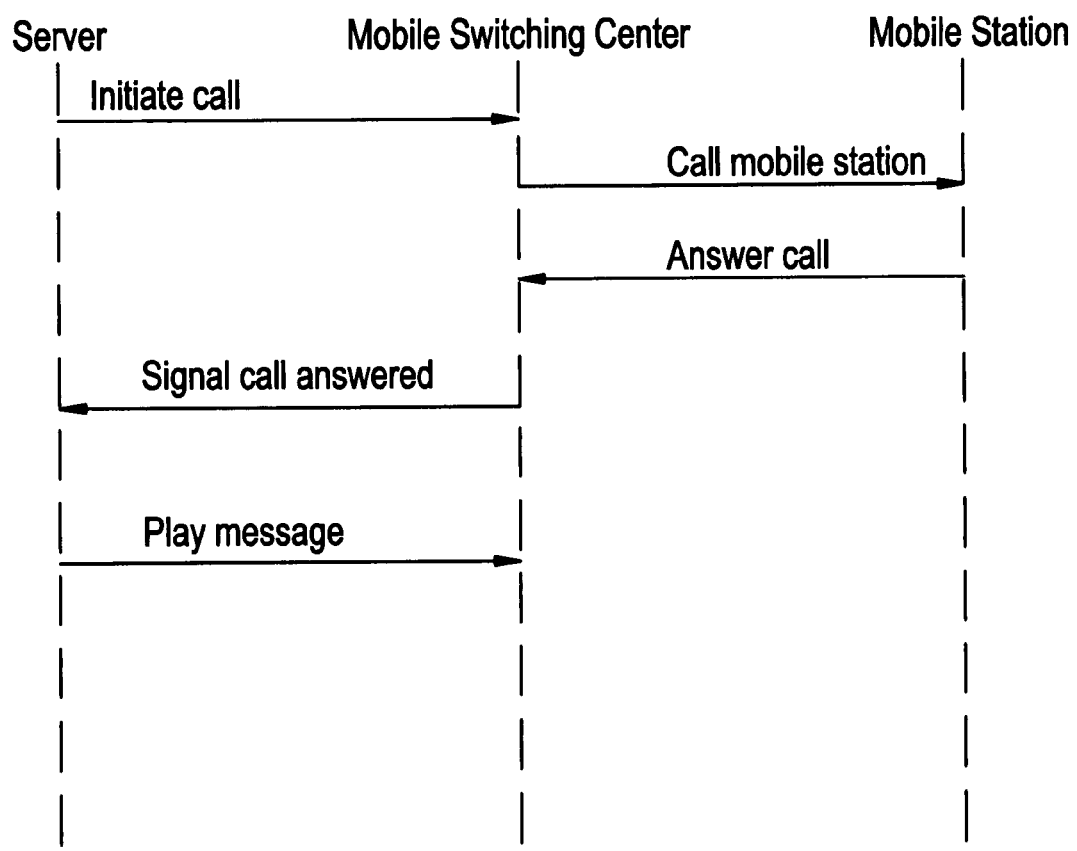
FIG. 2 is a diagram illustrating a scheduled communication, according to an example embodiment.

FIG. 2 is a diagram illustrating a scheduled communication, according to an example embodiment. As illustrated in FIG. 2, a server (e.g., server 113 or server 114) may initiate a call to a mobile station (e.g., MS 115). The Mobile switching center receives a call initiation request form the server, and subsequently pages and/or calls the mobile station to which the call is directed.

When or if the mobile station answers the phone call, the mobile switching center may signal the server that the call has been answered. Once the server is aware the call has been answered, the pre-recorded communication may be played during the call to the mobile station.

In an example embodiment, the server immediately plays or sends the scheduled communication during the call. For example, the server, upon receiving the signal that the call has been answered, would begin playing the pre-recorded message from Mike. In at least one example embodiment the server includes a delay before the server sends or plays the scheduled communication. For example, the server, upon receiving the signal that the call has been answered, would start a delay timer to delay when the scheduled communication is sent and/or played.

In an example embodiment, the server may play or send the scheduled communication once the called party acknowledges the call. For example, the server may be able to recognize typical voice prompts a person gives when answering a phone call, such as "Hello Mike!" or "Hi, this is Alice". The server, upon recognizing the call is answered based on the typical voice prompts, may play or send the scheduled communication during the call.

As illustrated in FIG. 2, there is no input necessary from the party scheduling the call on the server. More clearly, once the call is scheduled on the server, the server may enact the scheduled communication with no further input from the user scheduling the call. As such, the scheduled call may be implemented independent from the user, thereby ensuring the call is made if the user is busy or even if the mobile phone of the user is powered off or inoperable.

Figure 3:
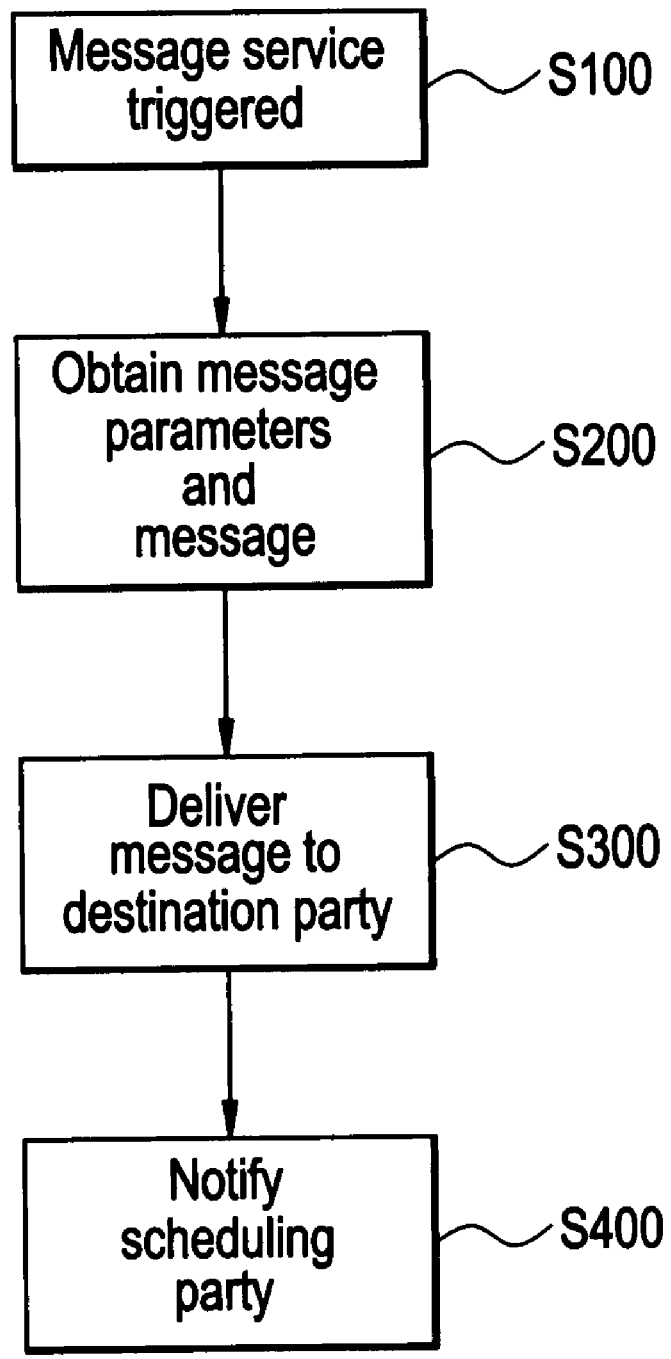
FIG. 3 is a flow-chart illustrating a method of providing a scheduled communication, according to an example embodiment.

FIG. 3 is a flow-chart illustrating a method of providing a scheduled communication, according to an example embodiment. As shown, in step S100, the mobile station (e.g., mobile station 115), triggers the scheduling service.

For example, in step S100 a user may dial a service number, dial the number of the party to whom the user wish to schedule a call along with a prefix or suffix, or etc. In the example given above, Mike would trigger the scheduling service to schedule the call to his sister by dialing a prescribed number such as a 1-800 number. In this example, the prescribed number is associated with the server 113, and the call is routed to the server 113.

Alternatively, Mike may add a prefix such as *20 when dialing his sister's number. In this example, the MSC 111 handling Mike's call recognizes the service trigger *20, and routes Mike's call to the server 113. Also, in this example, the number of the party to be called is supplied along with triggering the scheduling service.

Next, in step S200, the server 113 obtains parameters of the message that the user, triggering the call scheduling service, wishes to schedule. For example, the server 113 may include voice prompts to query the user for the message parameter information, and the user supplies the information in any well-known manner by depressing keypads on his mobile station. Alternatively, the server 113 may have voice recognition capabilities, and accept verbal input from the user.

The message parameter information obtained may include the number of the party to call, the time the user wishes the call be made, etc. In step S200, the server 113 also obtains the message to be delivered as scheduled by the message parameter information. For example, server 113 may record a voice message to be delivered. In the example given above, Mike entered the time and date he wished the server 113 to contact his sister. Mike further entered his sister's phone number, and recorded a voice message. Using this information, the server 113 was able to, at the time scheduled, initiate a call to Mike's sister and playback the recorded voice message.

It will be appreciated that the present invention is not limited to voice messages. Instead, the server 113 may also accept a text message to be sent at a scheduled time and date. It will be appreciated, that in this alternative, a call is not necessarily made to the destination party. Here, a SMS message may be sent. As a further alternative, both a text and a voice message may be supplied.

Furthermore, the present invention is not limited to providing the message parameter information via the user's mobile station. Instead, the user may contact the server 113 via the internet 125 using the computer 130. The server 113 may provide a web page, for example, via which the user may provide the message parameter information using the computer 130. Here, instead of simply recording a voice message, the user may provide an audio file that the user has prepared. The audio file may include a voice recording of the user, but may also or instead, include music, etc.

The server 113 may store the obtained message parameter information and message to be delivered in any suitable format. In the example above, the server 113 stored Mike's message along with the time and phone number used to call Mike's sister. The stored information was retrieved and used to initiate a phone call from the server to Mike's sister. In an example embodiment, the obtained message parameter information and the message to be delivered may be stored on the same server. In another example embodiment, a database is used to store call parameter information and a server or mass storage device is used to store the message.

Next, in step S300, the server 113 delivers the message at the proper date and time as specified by the message parameter information. As stated previously, the server 113 may initiate a call to the called party specified in the message parameter information at the time indicated in the message parameter information. When the called party answers the call, the server 113, for example, plays back the recorded voice message. Alternatively, the server 113 may play back the recorded voice message a delay time period after the called party answers the call, or after recognizing a verbal answer to the call. Furthermore, if the message is a text message, instead of calling the party to whom the message is destined, the server 113 sends the text message (e.g., SMS message) to the destination party.

Furthermore, with respect to step S300, if the destination party does not answer the call, the server 113 may be configured to retry the call a prescribed number of times at a prescribed interval between tries. The number of retries may also be established as part of the message parameter information. If the number of retries is reached without having reached the destination party, the server 113 may be configured to not deliver the message. Alternatively, the server 113 may be configured to convert the voice message to a text message, and send the text message. As a still further alternative, the voice message may be sent in an email to the destination party. The alternative or fall-back methods of delivery may be established as part of the message parameter information.

It will also be appreciated that the voice mail service for the destination party may answer the call, and the voice message may be left on destination party's voice mail.

In step S400, the server 113, after delivering the message, may notify the scheduling party that the message they scheduled has been delivered. This notification may be by way of text message, voice mail message, email message (e.g., to an email address supplied as part of the message parameter information), calling the scheduling party and playing a prerecorded voice message, etc. Furthermore, the notification may instead indicate a failure to delivery, or delivery by an alternative method. It will be appreciated that the method of delivering the notification may be set by the user as part of the message parameter information. This will also include the option of not having a delivery notification sent.

Example embodiments of the present invention being thus described, it will be obvious that the same may be varied in many ways. Such variations are not to be regarded as a departure from the spirit and scope of the present invention, and all such modifications are intended to be included within the scope of the invention.

I claim:

1. A method of providing scheduled message delivery in a wireless communication system, comprising:
   receiving, at a network element of the wireless communication system, a request from a scheduling party to schedule message delivery to a destination party;
   obtaining message delivery parameters in response to the request, the message delivery parameters including a date of delivery and contact information for the destination party;
   obtaining the message to be delivered by recording a voice message from the scheduling party;
   sending the obtained message to the destination party as set forth by the obtained message delivery parameters,
   wherein the sending step calls the destination party, and plays back the voice message if the call is recognized as answered by the destination party, and if the call is not recognized as answered, the sending step retries calling the destination party a number of times at a set time interval between tries, and
   wherein the obtaining message delivery parameters step includes obtaining the number of times the sending step retries calling the destination party if the call is unanswered and the set time interval between tries.

2. The method of claim 1, wherein the obtaining the message step records the voice message and obtains a text message from the scheduling party.

3. The method of claim 1, wherein the obtaining the message step obtains an audio file from the scheduling party; and the sending step calls the destination party and plays back the audio file.

4. The method of claim 1, wherein the receiving step receives a call from the scheduling party as the request.

5. The method of claim 1, wherein the obtaining message delivery parameters step includes obtaining the date of delivery, a time of delivery and a called party number of the destination party.

6. The method of claim 1, wherein the obtaining message delivery parameters step includes obtaining the date of delivery, a time of delivery and a called party number of the destination party;

the obtaining the message step records the-a voice message of the scheduled party; and the sending step calls the destination party on the date of delivery and at the time of delivery, and the sending step plays back the voice message if the call is answered.

7. The method of claim 1, further comprising:

sending notification to the scheduling party that the message has been delivered upon completion of the sending the obtained message step.

* * * * *